(12) United States Patent
Mäenpää et al.

(10) Patent No.: US 9,276,808 B2
(45) Date of Patent: Mar. 1, 2016

(54) PEER, APPLICATION AND METHOD FOR DETECTING FAULTY PEER IN PEER-TO-PEER NETWORK

(75) Inventors: Journi Mäenpää, Nummela (FI); Nalin Gupta, Espoo (IN); Jaime Jimenez, Espoo (FI)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/374,934

(22) PCT Filed: Feb. 27, 2012

(86) PCT No.: PCT/IB2012/050902
§ 371 (c)(1),
(2), (4) Date: Jul. 28, 2014

(87) PCT Pub. No.: WO2013/128235
PCT Pub. Date: Sep. 6, 2013

(65) Prior Publication Data
US 2014/0355413 A1 Dec. 4, 2014

(51) Int. Cl.
| | |
|---|---|
| H04L 12/26 | (2006.01) |
| H04L 12/24 | (2006.01) |
| H04L 29/08 | (2006.01) |
| H04L 12/715 | (2013.01) |
| H04L 12/703 | (2013.01) |
| H04L 25/24 | (2006.01) |

(52) U.S. Cl.
CPC ............ *H04L 41/0677* (2013.01); *H04L 25/24* (2013.01); *H04L 45/28* (2013.01); *H04L 45/64* (2013.01); *H04L 67/104* (2013.01); *H04L 67/1048* (2013.01); *H04L 67/1065* (2013.01); *H04L 67/1093* (2013.01)

(58) Field of Classification Search
None
See application file for complete search history.

(56) References Cited

U.S. PATENT DOCUMENTS

2008/0313500 A1* 12/2008 Strauss et al. .................. 714/37

FOREIGN PATENT DOCUMENTS

| EP | 2 003 845 A1 | 12/2008 |
| WO | 2009/149756 A1 | 12/2009 |

OTHER PUBLICATIONS

Written Opinion in corresponding International Application No. PCT/IB2012/050902 mailed Jan. 22, 2013.
International Preliminary Report on Patentability in corresponding International Application No. PCT/IB2012/050902 mailed Sep. 12, 2014.

(Continued)

*Primary Examiner* — Edan Orgad
*Assistant Examiner* — Rebecca Song
(74) *Attorney, Agent, or Firm* — Patent Portfolio Builders PLLC

(57) ABSTRACT

An application, peer and method for determining a faulty peer in a structured Peer-to-Peer overlay network. The overlay network includes plural peers besides the faulty peer. The method includes determining that a message sent from a given peer to a target peer along a first path did not reach the target peer; determining an intermediate peer at which the message had arrived; using a second path to send the message from the given peer to the target peer; determining that the message had arrived at the target peer on the second path; adjusting a node identifier (nodeID) of at least one of the target peer and the intermediate peer to obtain a new target peer or a new intermediate peer; and reusing the first and second paths to send the message to the new target peer or the new intermediate peer until the faulty peer is detected.

17 Claims, 5 Drawing Sheets

(56) References Cited

OTHER PUBLICATIONS

C. Jennings, et al.; "REsource LOcation and Discovery (RELOAD) Base Protocol"; Internet-Draft, P2PSIP; Aug. 3, 2011; pp. . (downloaded from the Internet at https://tools.ietf.org/html/draft-ietf-p2psip-base-26 on Oct. 1, 2014.].

International Search Report issued in corresponding International application No. PCT/IB2012/050902, date of mailing Jan. 22, 2013.

Zhuang, Shelley Q., et al., "On Failure Detection Algorithms in Overlay Networks," INFOCOM 2005; Proceedings of the 24th Annual Joint Conference of the IEEE Computer and Communications Societies, Miami, FL, USA, Mar. 13-17, 2005, Piscataway, NJ, vol. 3, pp. 2112-2123, XP010829335, DOI: 10.1109/INFOCOM. 2005.1498487; ISBN: 978-0-7803-8968-7.

Stoica, Ion, et al., "Chord: A Scalable Peer-to-peer Lookup Service for Internet Applications," Proceedings of ACM SIGCOMM, Aug. 27-31, 2001, San Diego, CA, USA, entire document, XP002332182.

Yu, Mei, et al., "Research on the DHT Algorithm-Chord," Next Generation Communication and Sensor Networks 2007, Proc. of SPIE, vol. 6773, Sep. 9, 2007, XP040248140; DOI: 10.1117/12. 752083.

* cited by examiner

PEER, APPLICATION AND METHOD FOR DETECTING FAULTY PEER IN PEER-TO-PEER NETWORK

TECHNICAL FIELD

The present invention generally relates to systems, software and methods and, more particularly, to mechanisms and techniques for detecting a faulty peer in a peer-to-peer (P2P) network.

BACKGROUND

P2P networks are utilized today in various contexts, for example, for file sharing or voice-over-IP. The P2P networks are classified as structured and unstructured networks. Structured P2P networks employ a globally consistent protocol to ensure that any peer can efficiently route a search to some peer that has the desired file or service. To achieve this, a structured pattern of overlay links is employed. The most common type of structured P2P networks are DHT (Distributed Hash Table) based networks. An example of a P2P DHT network is Chord (see Stoica et al., "Chord: A Scalable Peer-to-peer Lookup Service for Internet Applications," in Proceedings of the ACM SIGCOMM '01 Conference, San Diego, Calif., August 2001, pp. 149).

In the DHT, the information is stored among all the peers in the form of a hash table with several <key, value> pairs. When a peer in the overlay needs certain information, the peer has to perform a lookup of the key, and then to retrieve a value associated with the key if the key is stored in another peer. Traditional DHT algorithms use the concept of finger tables in order to route packets through the overlay. Each peer in a P2P overlay that uses the Chord DHT has a finger table. The finger table includes a list of pointers to other peers and a neighbor table, which is a list of the peers that are located one or few hops from the given peer. A peer is considered in this context to be a device.

For maintaining a fully functional P2P network, its peers need to constantly maintain their finger tables. This is achieved through probing other peers and observing the results. Due to the nature of the P2P networks, when all peers have correct finger tables, the whole P2P network is stable from a routing point-of-view. However, in the real world, peers constantly join and leave the P2P network, thereby, requiring the remaining peers to continuously update their finger tables. In addition, there are defective or malicious peers that drop the received data, or route the received data to a wrong peer (data forwarding problems) and these actions disrupt the functionality of the P2P network. A defective peers does not have the intention to disrupt the data traffic while a malicious peers has that intention. Thus, there are many ways in which a peer can disrupt the network. All these peers that are either defective or malicious are generically called herein as faulty peers.

As a result of the existence of the faulty peers, the network and its peers are unable to distinguish whether data forwarding problems are caused by churn (joins and/or leaves) or by a malicious peer having incentives to disrupt the network's normal operation. In other words, a peer sending information to the P2P network cannot know why the traffic is not reaching the destination peer. Moreover, even having the knowledge of an on-going attack, it is hard for a peer to mitigate the attack's effects because the culprit is unknown.

The detection of malicious peers in a P2P overlay is an ongoing problem that is yet to be completely solved. Current P2P networks do not have the ability of detecting malicious peers that misroute the packets or the ability to detect if a node is dropping the packets.

There are some approaches for achieving this functionality as discussed next. However, these approaches have their limitations. One approach is hop testing. It consists of using iterative routing to check the behavior of each hop in a route. Without iterative routing, this test is not usable and it is inefficient if the malicious peer is placed close enough to the target peer. Moreover, this approach is costly because it requires a large amount of messages to be exchanged between various peers.

Another approach is using an alternative routing path if the original routing path fails. This approach consists on analyzing the reply of the possible malicious peer, i.e., if the peer does not reply after a certain timeout or if the reply arrives too late (being therefore incorrectly routed). If this happens, the query is repeated over an alternative path. This approach only palliates the problem by trying a different path, but it does not help to localize the malicious peer.

Still another approach implements parallel routing. This approach assesses whether a node is responsible for a key or not. The approach sends one message to the suspected node using normal routing, then it sends a test message using iterative routing and an alternative path is opened. This method is not commonly used since it often generates false positives. The method also requires specially formatted messages.

From the above-discussion of the traditional approaches, it is noted that they focus on ensuring that the messages arrive to the destination, rather than detecting the peer or peers responsible for the incorrect routing and preventing them from continuing such behavior. Moreover, the existing approaches fail to prevent such behavior if the attacker is located close to the victim or if the network density is dissimilar. The existing approaches also require some amount of information regarding the full path route or the use of direct messages for each peer using expensive iterative routing. In addition, these approaches have to be performed in collaboration by several nodes.

Thus, there is a need to develop a new approach that can be performed by a single node, does not need supplementary information and also is capable to detect the position of the malicious peer. Accordingly, it would be desirable to provide devices, systems and methods that avoid the afore-described problems and drawbacks.

SUMMARY

The possibility of having one or more faulty peers in a P2P overlay network is likely. Thus, there is a need to have a mechanism (e.g., an application to be implemented in a computing device) in place that can detect the faulty peer. In one embodiment, a given peer in the overlay network determines that such a faulty peers exists when sending a message to a target peer along a first path. An intermediary peer that had received the message and is located prior to the faulty peer along the first path, replies back to the given peer. The application of the given peer is configured to use a second path, which is different from the first path, for transmitting the message to the target peer. It is likely that this path works and then the faulty peer is determined to be located between the target peer and the intermediary peer. At least one node id of the target peer or the intermediary peer is modified to obtain a new target peer or a new intermediary peer. Further messages are sent from the given peer to the new target peer and/or the new intermediary peer to narrow a location of the faulty peer. These steps are repeated until the new target peer or the new intermediary peer is located adjacent to the faulty peer.

According to one exemplary embodiment, there is an application for determining a faulty peer in a structured Peer-to-Peer, P2P, overlay network. The overlay network includes, besides the faulty peer, plural peers. The application is configured to execute the steps of determining that a message sent from a given peer to a target peer along a first path did not reach the target peer; a step of determining an intermediate peer, between the given peer and the target peer along the first path, at which the message had arrived. The application also includes a step of using a second path to send the message from the given peer to the target peer, wherein the second path is different from the first path; and a step of determining that the message had arrived at the target peer. Based on this information, the application adjusts a node identifier (nodeID) of at least one of the target peer and the intermediate peer to obtain a new target peer or a new intermediate peer; and reuses the first and second paths to send the message to the new target peer or the new intermediate peer until the faulty peer is detected.

According to another exemplary embodiment, there is a method for determining a faulty peer in a structured Peer-to-Peer, P2P, overlay network. The overlay network includes plural peers besides the faulty peer. The method includes a step of determining that a message sent from a given peer to a target peer along a first path did not reach the target peer; a step of determining an intermediate peer, between the given peer and the target peer along the first path, at which the message had arrived; and a step of using a second path to send the message from the given peer to the target peer, wherein the second path is different from the first path. The method then makes a determination that the message had arrived at the target peer and adjusts a node identifier (nodeID) of at least one of the target peer and the intermediate peer to obtain a new target peer or a new intermediate peer. The method reuses the first and second paths to send the message to the new target peer or the new intermediate peer until the faulty peer is detected.

According to another exemplary embodiment, there is a given peer configured to run an application for determining a faulty peer in a structured Peer-to-Peer, P2P, overlay network. The overlay network includes plural peers besides the given and the faulty peers. The given peer includes an interface configured to exchange a message with a target peer and a processor connected to the interface. The processor is configured to determine that the message sent to the target peer along a first path did not reach the target peer; determine an intermediate peer, between the given peer and the target peer along the first path, at which the message has arrived; and use a second path to send the message to the target peer, wherein the second path is different from the first path. The processor is further configured to determine that the message had arrived at the target peer; and to adjust a node identifier of at least one of the target peer and the intermediate peer to obtain a new target peer or a new intermediate peer. The processor then reuses the first and second paths to send the message to the new target peer or the new intermediate peer until the faulty peer is detected.

According to still another exemplary embodiment, there is an application that is implemented in a given peer of a structured Peer-to-Peer, P2P, overlay network. The overlay network includes plural peers besides the given peer. The application is configured to process dedicated plural fields in a message to be sent from the given peer to a target peer; and populate a direction field in the message, wherein the direction field indicates whether the message follows a clockwise path or a counter-clockwise path when the plural peers are provided in a closed loop. The application also maintains, in addition to a clockwise finger table, a counter-clock finger table at the given peer. The clockwise finger table indicates relationships among the plural nodes when the message follows the clockwise path and the counter-clockwise finger table indicates relationships among the plural nodes when the message follows the counter-clockwise path.

Thus, it is an object to overcome some of the deficiencies discussed in the previous section and to provide a mechanism that determines not only the presence of a faulty peer but also its location with minimum disruption to the network. One or more of the independent claims advantageously provides such a mechanism for determining the faulty peer.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a P2P DHT network. However, the novel embodiments are not limited to this network, but may be applied to other types of networks.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

According to an exemplary embodiment, there is a method for detecting faulty peers (malicious or not) that misbehave or that do not operate according to an expected behaviour in a structured P2P overlay network. The reasons for misbehaving or operating in an unexpected manner are not relevant for the purpose of the invention. In one application, the method determines whether one particular peer is faulty without iterative routing. Further, the method may help to narrow the overlay area where the peer dropping messages is suspected to be located. In one application, the method determines the exact location in the overlay network of the faulty peer.

Figure 1:
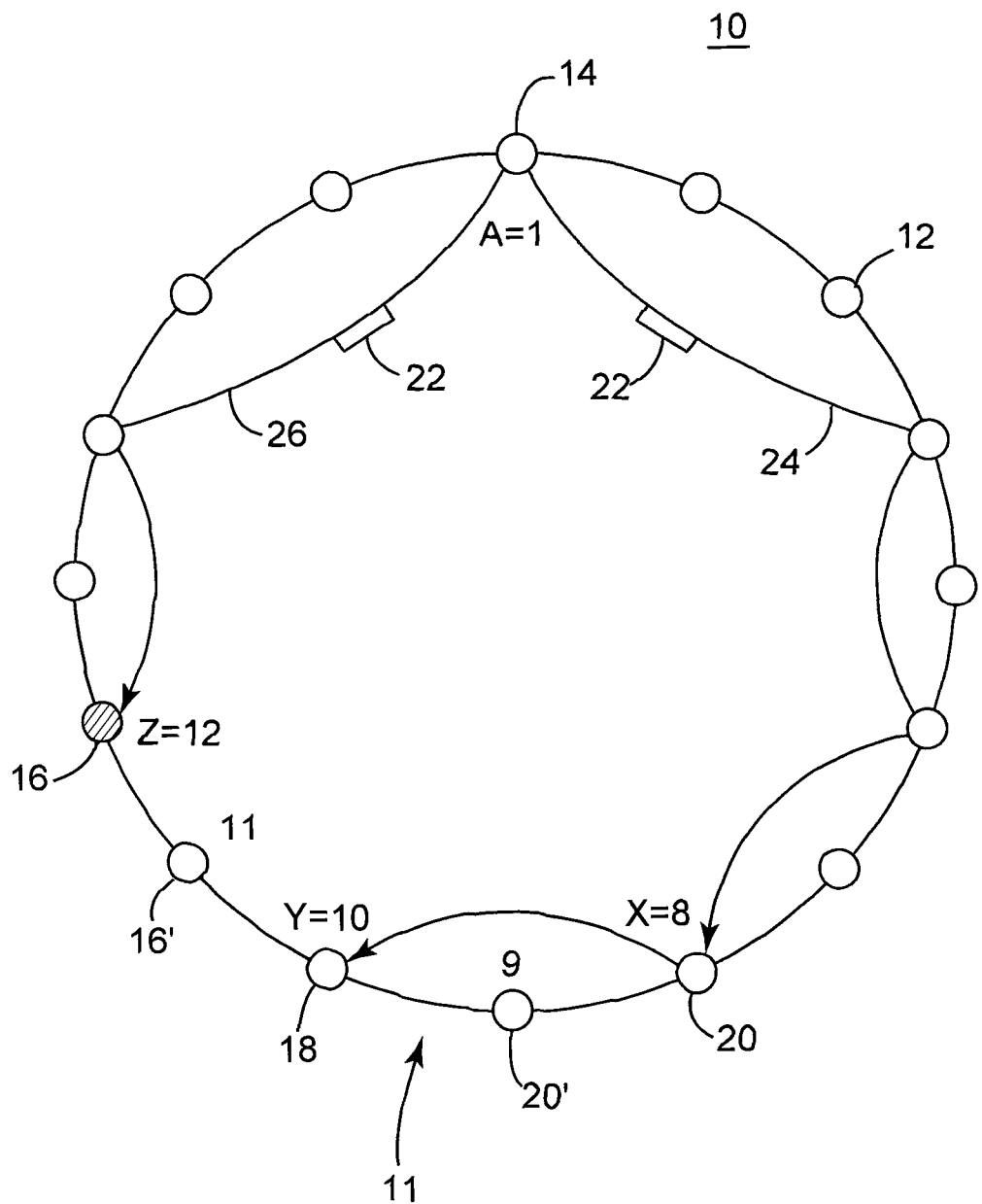
FIG. 1 is a schematic diagram of a P2P network having a faulty peer according to an exemplary embodiment.

In a DHT overlay network 10 such as Chord, see FIG. 1, plural peers 12 are distributed along a closed loop (e.g., ring) 11. A given peer 14 is considered in the embodiment shown in FIG. 1 to send a message 22 to a target peer 16. Any peer 12 may perform the acts to be described next for the given peer 14. A faulty peer 18 is assumed to not transmit the message from the given peer 14 to the target peer 16. Various mechanisms may be imagined for the faulty peer 18 for not transmitting the messages. The novel features are considered broad enough to cover any of these mechanisms.

The message 22 is routed, by default, along a first path 24, e.g., in a clockwise direction in FIG. 1. The novel features are applicable even if the default is a different path. The message is forwarded by intermediary peers until the message reaches its destination, e.g., target peer 16. An alternative way of forwarding the message 22 is along a second path 26, i.e., a counter-clockwise direction in FIG. 1. Thus, the messages in the counter-clockwise path are forwarded in an opposed direction relative to the clockwise path. The novel mechanism works by sending clockwise and counter-clockwise messages to peers located in the area where the faulty peer is located. In one application, several iterations are performed until the faulty node is found.

Figure 2:
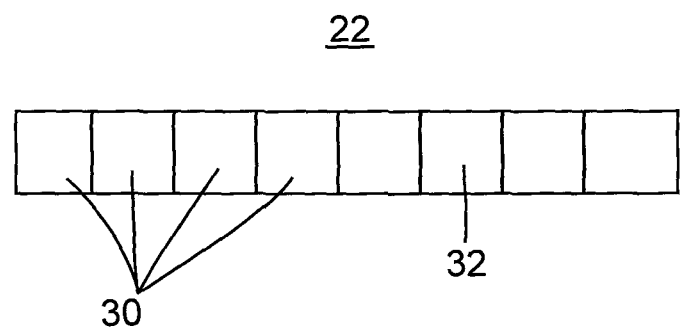
FIG. 2 is a schematic diagram of a message header according to an exemplary embodiment.

In order to keep track of the message 22 whether following the first or the second path, it is possible to introduce in the header of the message 22, besides existing dedicated fields 30 (e.g., a list of the nodes that the message has traversed, a list of the nodes that the message should traverse, time to live, etc.), a new field 32, as illustrated in FIG. 2. For example, in a Chord-based protocol, like Resource Location And Discovery (RELOAD), which is a P2P signaling protocol standardized in the Internet Engineering Task Force (IETF), it is possible to introduce the new field 32 to keep track of whether the message follows the clockwise path 24 or the counter-clockwise path 26. Thus, the new field 32 may be a single bit.

In other words, this new field identifies how a message should be forwarded, i.e., in a clockwise direction or a counter-clockwise direction. When a peer (i.e., a node, where the node may be a computer, a mobile phone, a tablet, etc.) receives a clockwise message, the peer would route it normally through the overlay 10. A counter-clock message would imply routing it in the opposite direction. A traditional overlay network has a finger table associated with each peer. In other words, each peer stores in a storage device a finger table that is used when necessary to forward a message in the clockwise direction to a next peer. It is noted that in a traditional overlay network, the messages are transmitted by default in a single direction. In an exemplary embodiment, each peer that has the novel application to be discussed next, has an additional finger table for counter-clockwise routing.

The novel features may be viewed as a new mechanism or method or application to be embedded into a peer for determining the faulty peer. Thus, reference to a method or mechanism or application is understood in this document to represent one possible implementation of the novel features. Still with regard to FIG. 1, it is considered now how the given peer 14 detects the location of the faulty peer 18. It is noted that the peers in FIG. 1 have a certain position/order in the loop 11, e.g., the given peer 14 occupies position 1, the target peer 16 occupies position 12, the faulty peer 18 occupies position 10, etc.

According to a novel method, the given peer 14 sends the message 22 along the clockwise path 24 to the target peer 16. A message 22 is understood to include a structured header as illustrated in FIG. 2, that includes the known fields 30 and the novel field 32 mentioned above. The novel field 32 may be called a direction field because this field indicates the propagation direction of the message along the closed loop 11. If an acknowledgment is received from the target peer 16, the given peer 14 concludes that there is no faulty peer along the path 24.

However, if the given peer 14 receives no acknowledgment or the waiting times out, the given peer 14 determines that a faulty peer is present along path 24, between the given peer 14 and the target peer 16. The overlay network may be configured such that the last peer that received the message 22 from the given peer 14 acknowledges that it receives the message. In this way, the given peer 14 becomes aware that an intermediate peer 20 is the last peer that received the message 22.

Thus, at this point, the given peer 14 knows that the faulty peer 18 exists and it is located between the target peer 16 and the intermediary peer 20. However, the given peer 14 does not know yet the exact position of the faulty peer 18. The given peer 14 now sends the message 22 to the target peer 16 using a second path 26, which is the counter-clockwise path. Assuming that no other faulty peer is present, the given peer 14 should receive an acknowledgment message from the target peer 16 along the second path 26. This confirms that the faulty peer 18 is located between the target peer 16 and the intermediary peer 20.

Next, the method may optionally send again the message 22, from the given peer 14 to the target peer 16 along the first path 24 and then, may send the message 22 from the given peer 14 to the intermediary peer 20 along the second path 26 to confirm that the faulty peer 18 is located between the target peer 16 and the intermediary peer 20 and/or to collect more information. In one application, the given peer 14 sends four messages, two messages to the intermediary peer 20 (each along a different path) and two messages to the target peer 16 (each along a different path). This causes to find either more functioning peers between the target peer and the intermediate peer, in which case they become the new target or intermediary peers or to find no more peers.

If the second scenario takes place, i.e., determining that the faulty peer 18 is located between the target peer 16 and the intermediary peer 20 and no other peers is present (in the sense that it is known to the given peer 14) between the intermediary peer 20 and the faulty peer 18, the method modifies a node identifier (nodeID) of at least one of the target peer 16 or the intermediary peer 20 by a constant value. The constant value may be, for example, one.

For example, the method may increase the nodeID of the intermediary peer 20 from 8 to 9 to determine a new intermediary peer 20' or may decrease the nodeID of the target peer 16 from 12 to 11 to determine a new target peer 16'. In this way, the method narrows the interval around the faulty peer 18. In one embodiment, the method may simultaneously increase one nodeID and decrease the other nodeID to obtain a new target peer 16' and a new intermediary peer 20'.

The steps of increasing at least one nodeID for the new target peer or the new intermediary peer may continue while new functioning nodes are found. The functioning nodes may be called anchors. In this way, the method sweeps the ID space between the anchors using the DHT itself. Thus, the novel method is fast on the initial iterations. After some iterations, there will be two anchors (new target peer and new intermediary peer) that sandwich the faulty peer 18 and no new anchors can be found. This indicates that the position of the faulty peer 18 has been found, therefore finishing the process and validating the faulty peer's faultiness.

Figure 3:
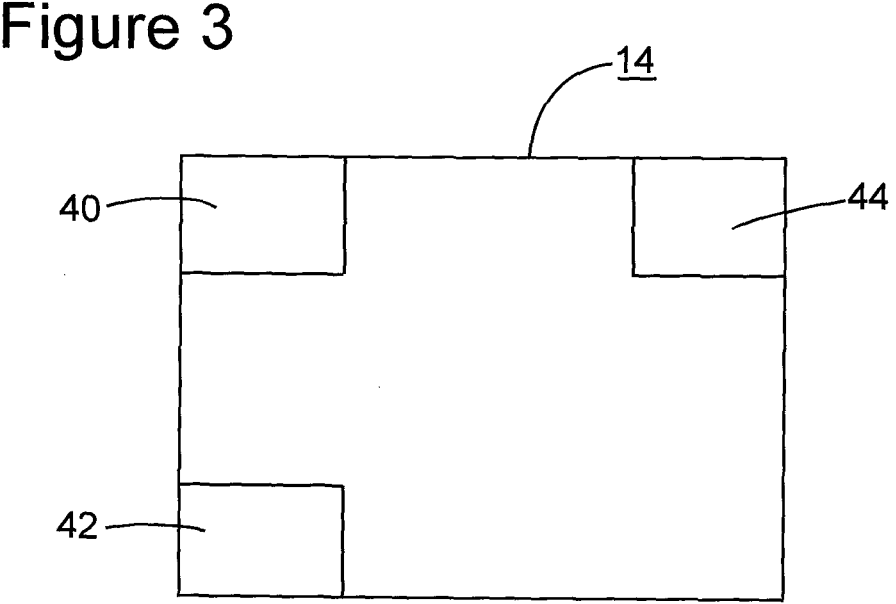
FIG. 3 is a schematic diagram of a peer having clockwise and counter-clockwise tables according to an exemplary embodiment.

As noted above, because the nodes in the overlay network 10 need to know their successors along both the clockwise path and the counter-clockwise path, a peer 14, as illustrated in FIG. 3, needs to maintain not only a clockwise finger table 40 for the successors along the clockwise path 24 but also a counter-clockwise finger table 42 for the successors along the counter-clockwise path 26. The steps noted above for detecting the position of the faulty peer may be implemented as an application 44 that is stored in the peer 14 and run, for example, by a processor of the peer 14.

One advantage of the novel method is that no expensive iterative routing is necessary. Also, the method can be used to validate any part of the overlay network by appropriately choosing two anchors. The new field 32 that need to be added to the message 22 may take only one bit to represent the clockwise or counter-clockwise information. Therefore, the additional header size is minimal.

Figure 4:
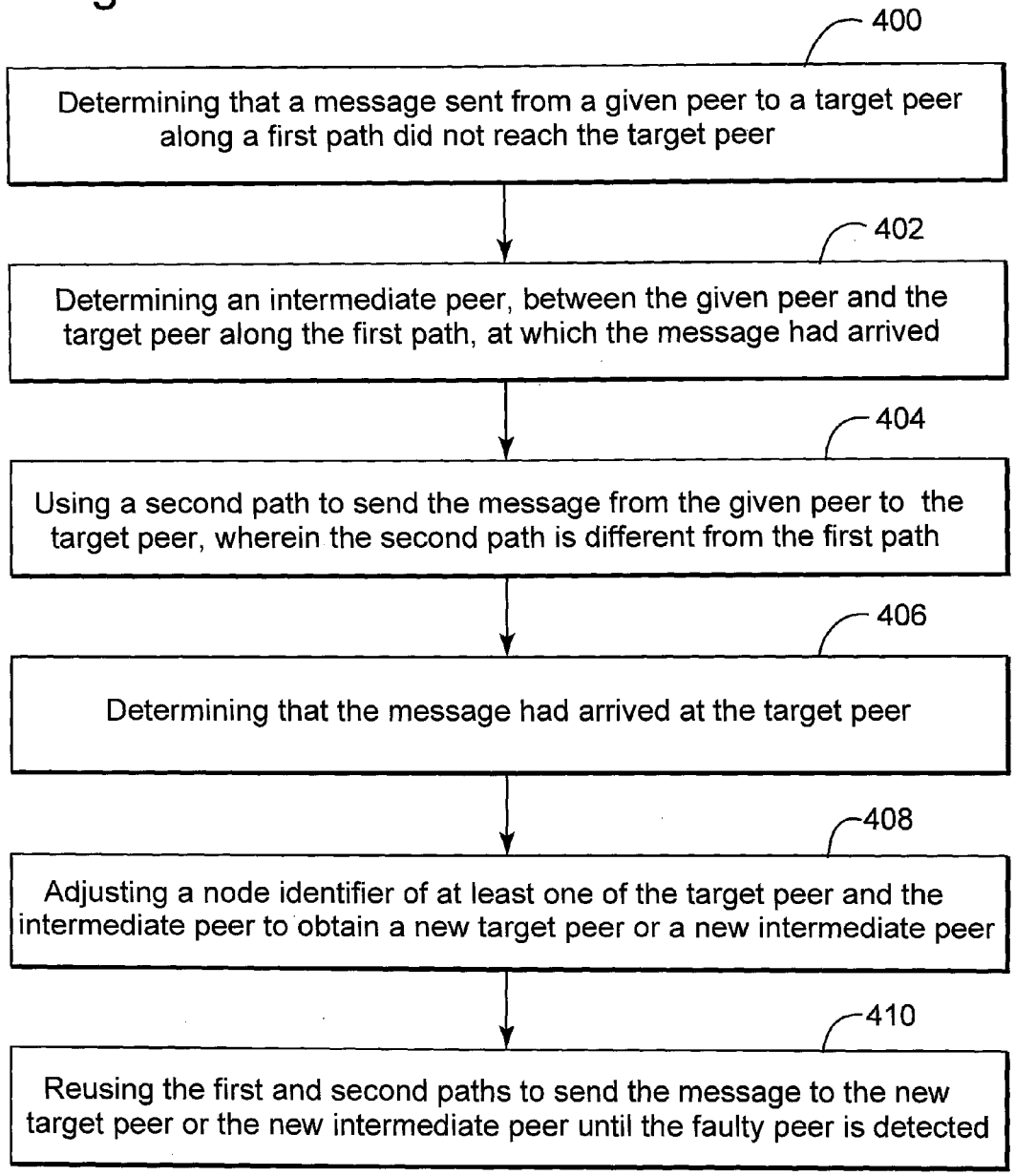
FIG. 4 is a flowchart of a method for detecting a faulty peer in a P2P network according to an exemplary embodiment.

One method that implements the above-noted mechanism is now described with regard to FIG. 4. The method includes a step 400 of determining that a message sent from a given peer to a target peer along a first path did not reach the target peer; a step 402 of determining an intermediate peer, between the given peer and the target peer along the first path, at which the message had arrived; a step 404 of using a second path to send the message from the given peer to the target peer, wherein the second path is different from the first path; a step 406 of determining that the message had arrived at the target peer along the second path; a step 408 of adjusting a node identifier of at least one of the target peer and the intermediate peer to obtain a new target peer or a new intermediate peer; and a step 410 of reusing the first and second paths to send the message to the new target peer or the new intermediate peer until the faulty peer is detected.

Having determined the location of the faulty peer, the other peers may be configured to ignore the faulty peer. For example, if most of the peers implement the novel method discussed above, the faulty peers would eventually be ignored even if they are part of the overlay network ring. In one application, there are security certificates shared among the peers. Those certificates still need revocation. This revocation may be achieved as discussed next.

Figure 5:
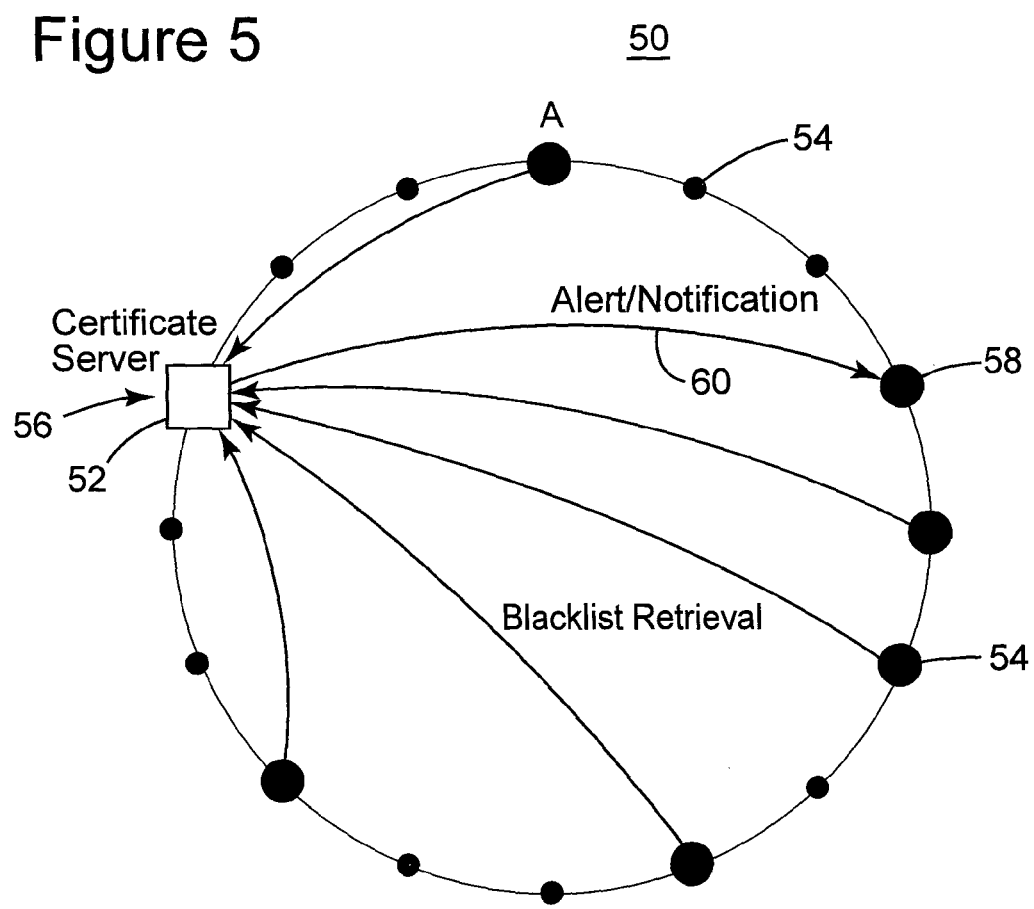
FIG. 5 is a schematic diagram illustrating the removal of rights of a faulty peer in a P2P network according to an exemplary embodiment.

Assume that the DHT overlay 50 shown in FIG. 5 is part of the same Certification Authority, i.e., enrollment server 52, which is responsible for assigning certificates to all the peers 54 in the overlay. The peer 56 that hosts the enrollment server 52 and is responsible for storing and managing the security certificates (e.g., certificate peer) can request the other peers 54 to provide a list that includes the peers perceived or detected as being faulty peers. The certificate peer 56 can correlate these lists and determine those peers 58 that appear in a predetermined number of the lists (to be defined by the administrator of the network). After identifying the potential faulty peers 58, the certificate peer 56 may be configured to perform an appropriate action, such as revoking the certificate of the faulty peers, or add the suspected faulty peer to a blacklist, etc. In one application, the enrollment server notifies in step 60 the faulty peer about this certificate revocation act or the blacklisting act so that the faulty peer is made aware of a malfunction in its system.

Based on the above-noted embodiments, it is noted that the novel mechanism advantageously allows a given peer to locate a faulty peer and to ignore it when creating a local view of the P2P network. The reason for the faulty peer to misact may not be an active attack, but it could also be a network related error. In one exemplary embodiment, the novel mechanism allows sweeping an area between two peers and nearby a suspected faulty peer in order to determine the location of the faulty peer. The novel mechanism does not require a network-wide solution or a special status in the overlay (i.e., superpeer status). Instead, the novel mechanism may be implemented at individual peers and they locally store the results of the detection. Thus, there is no hardware upgrade requirement for implementing this mechanism. Any peer in the overlay network can be configured (provided with an appropriate application) to analyze whether a suspected peer is faulty or not.

Alternatively, the novel mechanism does not require special payloads in the text messages exchanged between the peers and thus, avoids the problem of some existing approaches that the message might be suspicious to malicious peers. One other advantage is that the novel method provides a mechanism for alerting and notifying the faulty peer about such status and to revoke its security certificate. It is further noteworthy to mention that the novel mechanism is suitable for multiple DHT algorithms and multiple P2P signaling protocols, and RELOAD is just one possible case. In one application, a single peer is enough to validate and find possible faulty peers in the overlay network.

Figure 6:
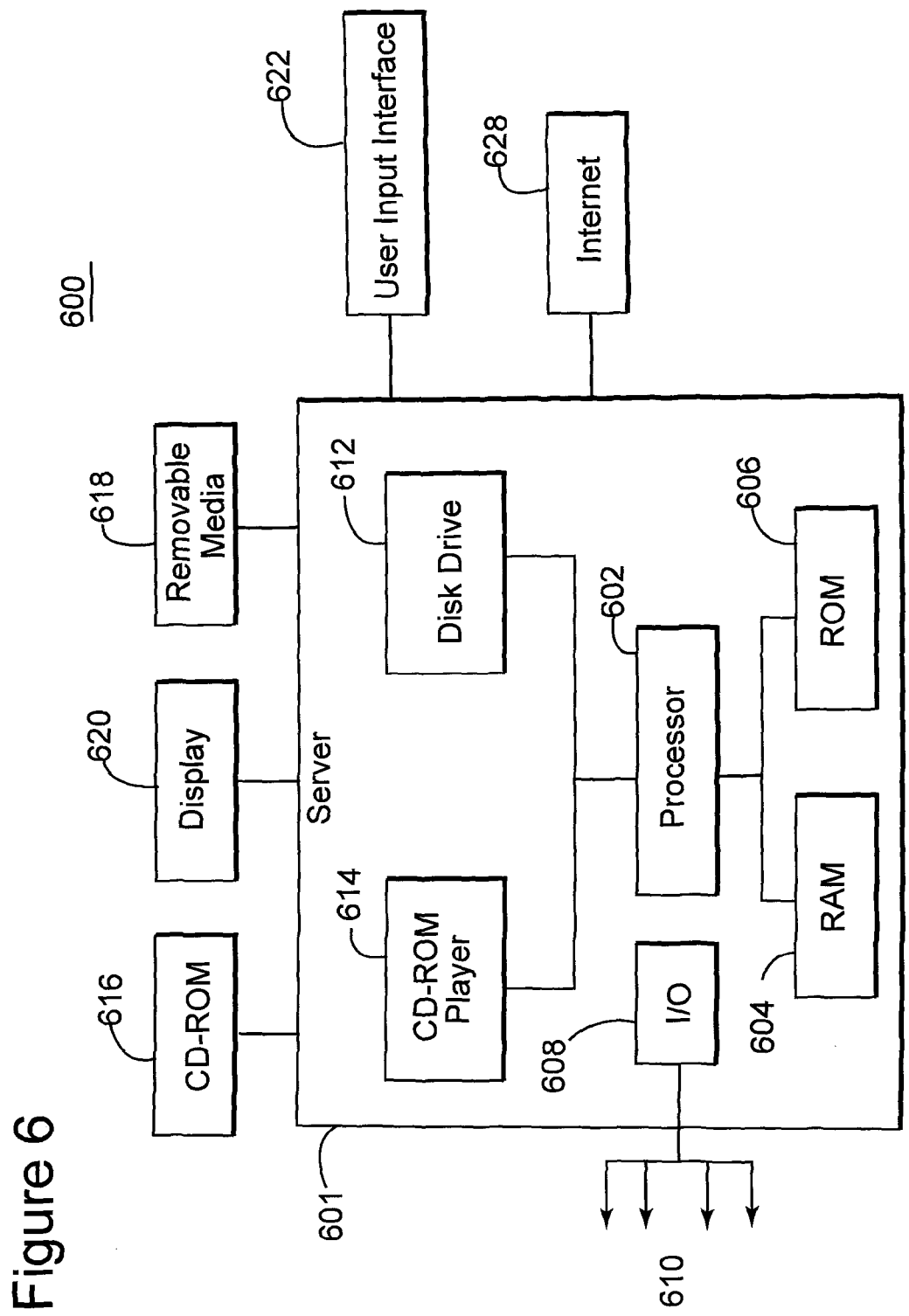
FIG. 6 is a schematic diagram of a peer in which the method of claim 4 may be implemented.

For purposes of illustration and not of limitation, an example of a representative peer structure capable of carrying out operations in accordance with the exemplary embodiments is illustrated in FIG. 6. Hardware, firmware, software or a combination thereof may be used to perform the various steps and operations described herein.

The exemplary peer structure 600 suitable for performing the activities described in the exemplary embodiments may include or not a server 601. Such a server 601 may include a central processor (CPU) 602 coupled to a random access memory (RAM) 604 and to a read-only memory (ROM) 606. The ROM 606 may also be other types of storage media to store programs, such as programmable ROM (PROM), erasable PROM (EPROM), etc. The processor 602 may communicate with other internal and external components through input/output (I/O) circuitry 608 and bussing 610, to provide control signals and the like. The processor 602 carries out a variety of functions as is known in the art, as dictated by software and/or firmware instructions.

The server 601 may also include one or more data storage devices, including hard and disk drives 612, CD-ROM drives 614, and other hardware capable of reading and/or storing information such as DVD, etc. In one embodiment, software for carrying out the above discussed steps may be stored and distributed on a CD-ROM 616, removable media 618 or other form of media capable of portably storing information. These storage media may be inserted into, and read by, devices such as the CD-ROM drive 614, the disk drive 612, etc. The server 601 may be coupled to a display 620, which may be any type of known display or presentation screen, such as LCD displays, LED displays, plasma display, cathode ray tubes (CRT), etc. A user input interface 622 is provided, including one or more user interface mechanisms such as a mouse, keyboard, microphone, touch pad, touch screen, voice-recognition system, etc.

The server 601 may be coupled to other computing devices, such as the landline and/or wireless terminals, via a network. The server may be part of a larger network configuration as in a global area network (GAN) such as the Internet 628, which allows ultimate connection to the various landline and/or mobile client/watcher devices.

The disclosed exemplary embodiments provide a peer device, a method and a computer program product for preventing a packet channel to time out when a user terminal receives content from a cache located downstream from a core network of a communication network. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed computer or processor.

What is claimed is:

1. A process for determining a faulty peer in a structured Peer-to-Peer, P2P, overlay network, the overlay network including, besides the faulty peer, a plurality of peers, the process comprising:
   determining that a message sent from a given peer to a target peer which is different from the given peer, along a first path including first peers did not reach the target peer;
   determining an intermediate peer among the first peers, between the given peer and the target peer along the first path, at which the message last arrived;
   sending the message from the given peer to the target peer on a second path including second peers, wherein the second peers on the second path are different from the first peers on the first path;
   determining that the message arrived at the target peer along the second path to confirm that the faulty peer is located between the target peer and the intermediate peer;
   in response to determining that the message arrived at the target peer along the second path, adjusting a node identifier (nodeID) of the target peer or the intermediate peer to obtain a new target peer or a new intermediate peer of an updated first path; and
   sending the message via the updated first path and the second path to the new target peer or via the new intermediate peer until the faulty peer is detected.

2. The process of claim 1, wherein the first path has only the given peer and the target peer in common with the second path.

3. The process of claim 1, wherein the first path is clockwise and the second path is counter-clockwise.

4. The process of claim 1, further comprising:
   determining that the message did not reach the target peer along the first path because the faulty peer did not transmit the message toward the target peer as instructed in the message.

5. The process of claim 1, wherein the step of adjusting comprises:
   increasing or decreasing by a constant value the node identifier of the target peer or the intermediate peer to narrow a distance between (i) the new target peer and the intermediate peer or (ii) the target peer and the new intermediate peer.

6. The process of claim 1, wherein the step of adjusting comprises:
   increasing or decreasing by a constant value the node identifier of the target peer and the node identifier of the intermediate peer to narrow a distance between (i) the new target peer and the new intermediate peer.

7. The process of claim 6, further comprising:
   continuing to increase or decrease with the constant value the node identifier of the new target peer and the node identifier of the new intermediate peer until the new target peer or the new intermediate peer is adjacent to the faulty peer.

8. The process of claim 1, wherein the process is implemented at a given peer.

9. A method for determining a faulty peer in a structured Peer-to-Peer, P2P, overlay network, the overlay network including a plurality of peers besides the faulty peer, the method comprising:
   sending a message on a first path from a given peer to a target peer, which is different from the given peer, via first intermediate peers;
   determining that a message sent along the first path did not reach the target peer;
   determining an intermediate peer among the first peers, at which the message last arrived;
   sending the message in a second path from the given peer to the target peer via second intermediate peers, wherein the second intermediate peers are distinct from the first intermediate peers;
   determining that the message sent along the second path arrived at the target peer to confirm that the faulty peer is located between the target peer and the intermediate peer;
   in response to determining that the message arrived at the target peer along the second path, adjusting a node identifier of the target peer or the intermediate peer to obtain a new target peer or a new intermediate peer thereby updating the first path; and
   sending the message via the updated first path and the second path to the new target peer or via the new intermediate peer until the faulty peer is detected.

10. The method of claim 9, wherein none of the second intermediate peers is on the first path and none of the first intermediate peers is on the second path.

11. The method of claim 9, wherein the first path is clockwise and the second path is counter-clockwise.

12. The method of claim 9, further comprising:
determining that the message did not reach the target peer along the first path because the faulty peer did not transmit the message toward the target peer as instructed in the message.

13. The method of claim 9, wherein the step of adjusting comprises:
increasing or decreasing by a constant value the node identifier of the target peer or the intermediate peer to narrow a distance between (i) the new target peer and the intermediate peer or (ii) the target peer and the new intermediate peer.

14. The method of claim 9, wherein the step of adjusting comprises:
increasing and decreasing by a constant value the node identifier of the target peer or the intermediate peer to narrow a distance between (i) the new target peer and the intermediate peer or (ii) the target peer and the new intermediate peer.

15. A given peer configured to run an application for determining a faulty peer in a structured Peer-to-Peer, P2P, overlay network, the overlay network including a plurality of peers besides the given and the faulty peers, the given peer comprising:
an interface configured to exchange a message with a target peer; and
a processor connected to the interface and configured to,
determine that the message sent to the target peer along a first path did not reach the target peer;
determine an intermediate peer, between the given peer and the target peer along the first path, at which the message last arrived;
use a second path to send the message to the target peer, wherein the second path is different from the first path;
determine that the message arrived at the target peer along the second path to confirm that the faulty peer is located between the target peer and the intermediate peer;
in response to determining that the message arrived at the target peer along the second path, adjust a node identifier of at least one of the target peer and the intermediate peer to obtain a new target peer or a new intermediate peer; and
reuse the first and second paths to send the message to the new target peer or the new intermediate peer until the faulty peer is detected.

16. The given peer of claim 15, wherein the processor is further configured to:
increase or decrease by a constant value the node identifier of the target peer or the intermediate peer to narrow a distance between (i) the new target peer and the intermediate peer or (ii) the target peer and the new intermediate peer; and
continue to increase or decrease with the constant value the node identifier of the new target peer or the new intermediate peer until the new target peer or the new intermediate peer is adjacent to the faulty peer.

17. A process performed by a given peer of a structured Peer-to-Peer, P2P, overlay network, the overlay network including a plurality of peers besides the given peer, the process comprising steps of:
processing dedicated plural fields in a message to be sent from the given peer to a target peer;
populating a direction field in the message, wherein the direction field indicates whether the message follows a clockwise path or a counter-clockwise path when the plurality of peers are provided in a closed loop;
maintaining, in addition to a clockwise finger table, a counter-clock finger table at the given peer;
sending the message on the clockwise path and on the counter-clockwise path;
determining that the message sent from the given peer to the target peer along the clockwise path did not reach the target peer;
determining an intermediate peer, between the given peer and the target peer along the clockwise path, at which the message last arrived;
determining that the message sent from the given peer to the target peer along the counter-clockwise path arrived at the target peer to confirm that the faulty peer is located between the target peer and the intermediate peer;
in response to determining that the message arrived at the target peer along the counter-clockwise path, adjusting a node identifier of the target peer or the intermediate peer to obtain a new target peer or a new intermediate peer thereby updating the clockwise path; and
sending the message on the updated clockwise path and on the counter-clockwise path until the faulty peer is detected, wherein the clockwise finger table indicates relationships among the plural nodes when the message follows the clockwise path and the counter-clockwise finger table indicates relationships among the plural nodes when the message follows the counter-clockwise path.

* * * * *